US007840857B2

(12) United States Patent
Breiter et al.

(10) Patent No.: US 7,840,857 B2
(45) Date of Patent: Nov. 23, 2010

(54) METHOD AND SYSTEM FOR AUTOMATED HANDLING OF RESOLVABLE AND NON-RESOLVABLE ERRORS IN EXECUTION OF SYSTEM MANAGEMENT FLOWS CONSISTING OF SYSTEM MANAGEMENT TASKS

(75) Inventors: Gerd Breiter, Wildberg (DE); Ruediger Maass, Boeblingen (DE); Steffen Rost, Nufringen (DE); Thomas Spatzier, Schuenich (DE)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 11/856,759

(22) Filed: Sep. 18, 2007

(65) Prior Publication Data

US 2008/0077935 A1 Mar. 27, 2008

(30) Foreign Application Priority Data

Sep. 25, 2006 (EP) .................................. 06121214

(51) Int. Cl.
*G06F 11/00* (2006.01)
(52) U.S. Cl. ....................................................... 714/48
(58) Field of Classification Search ............... 714/8–13, 714/15, 16, 20, 26, 27, 31, 37, 39, 48, 49, 714/51, 57
See application file for complete search history.

(56) References Cited

U.S. PATENT DOCUMENTS

| | | | |
|---|---|---|---|
| 6,470,375 B1* | 10/2002 | Whitner et al. | 718/105 |
| 6,901,530 B2* | 5/2005 | Cerami et al. | 714/4 |
| 6,961,865 B1* | 11/2005 | Ganesh et al. | 714/2 |
| 6,981,039 B2* | 12/2005 | Cerami et al. | 709/223 |
| 7,600,155 B1* | 10/2009 | Nickolls et al. | 714/38 |
| 2002/0073062 A1* | 6/2002 | Cerami et al. | 707/1 |
| 2003/0084134 A1* | 5/2003 | Pace et al. | 709/223 |
| 2006/0233312 A1* | 10/2006 | Adams et al. | 379/21 |
| 2007/0067452 A1* | 3/2007 | Fung et al. | 709/224 |

OTHER PUBLICATIONS

Casati, "Specification and Implementation of Exceptions in Workflow Management Systems", 2000, ACM, pp. 405-445.*

* cited by examiner

*Primary Examiner*—Nadeem Iqbal
(74) *Attorney, Agent, or Firm*—John E. Campbell; Lynn L. Augspurger

(57) ABSTRACT

The present invention provides a method and system for automated handling of resolvable and non-resolvable errors in the execution of system management flows by enhancing Workflow Engines (30) by an Error Handling component (40) and by adding a supportive Error Handling Layer (60, 90, 100) to invoked system management tasks which serves as the counterpart to the Workflow Engine's Error Handling component (see FIG. 2). The additional functionality of the task-provided Error Handling Layer (90, 70, 100) is accessible for the Workflow Engine via extended web services interfaces (91, 71, 101). The Workflow Engine's Error Handling component (40) and the task-provided Error Handling Layer allow for the definition of a standard protocol between the Workflow Engine and invoked tasks (31) for automated error handling.

18 Claims, 6 Drawing Sheets

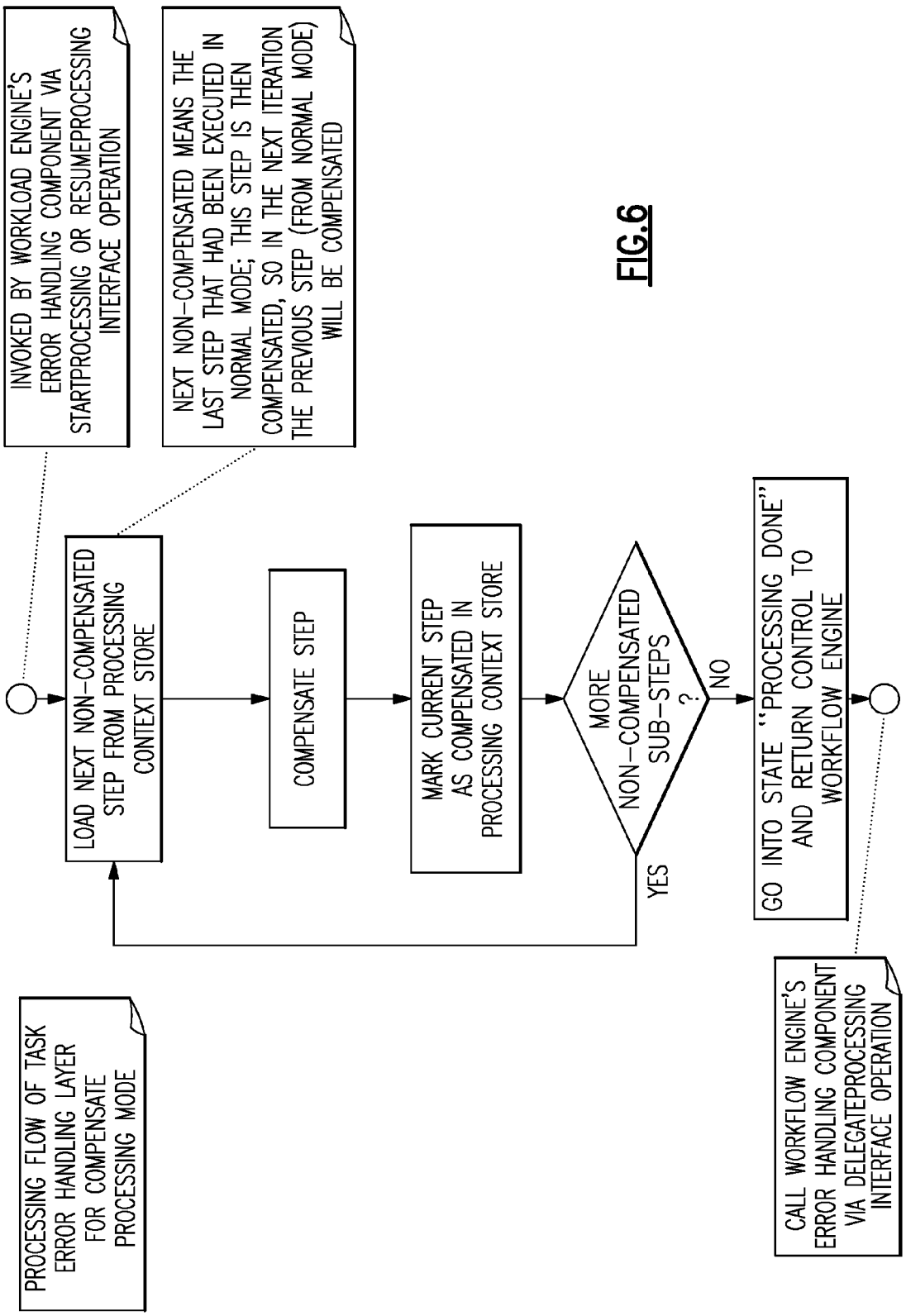

METHOD AND SYSTEM FOR AUTOMATED HANDLING OF RESOLVABLE AND NON-RESOLVABLE ERRORS IN EXECUTION OF SYSTEM MANAGEMENT FLOWS CONSISTING OF SYSTEM MANAGEMENT TASKS

TECHNICAL FIELD OF THE INVENTION

The present invention relates to executions of system management flows, and in particular to a method and system for automated handling of resolvable and non-resolvable errors in execution of system management flows consisting of system management tasks.

BACKGROUND OF THE INVENTION

The present invention is concerned with the management of complex IT infrastructures (1) consisting of distributed heterogeneous resources (see FIG. 1). The management of such IT infrastructures is—in most cases—done by performing a number of system management tasks (tasks) in a certain sequence in order to reach a certain management goal. Such a sequence of system management tasks is called a system management flow (2) within this invention.

Each task in a system management flow fulfills a certain sub-goal within the overall flow and thus contributes to the overall goal of the complete system management flow. System management tasks (10-12) are provided by system management applications (e.g. Tivoli Provisioning Manager, Tivoli System Automation etc.) and can be leveraged to perform certain actions on the managed IT infrastructure (1). For example, tasks (10-12) provided by Tivoli Provisioning Manager can be used to provision new resources to an IT infrastructure (1).

In order to allow integration into a management flow, said tasks (10-12) provide standards-based web services interfaces (13-15) via which tasks get invoked (20) during the execution of a system management flow.

From an architectural perspective, system management flow (2) in FIG. 1 is primarily a logical flow description that arranges the single tasks according to their dependencies among each other. That is, a task N might depend on the result of a task N−1, and yet another task N+1 can only be executed if task N has finished.

In order to get executed, such a logical system management flow has to be converted (encoded) into a detailed flow definition that can be executed by a Workflow Engine (19). Typically, such a detailed flow definition contains the following items for each task (e.g. task 3) defined in the logical system management flow: invoke the task via its web services interface; wait for the response; analyze and process the response. A commonly used standard for said detailed flow definitions is the Business Process Execution Language (BPEL).

While the logical system management flow (2) is a mostly straight-forward definition of a certain sequence of tasks, the detailed flow definition (e.g. written in BPEL) can become very complex as soon as it comes to the handling of errors that can occur in single system management tasks. Errors that occur during runtime have to be resolved before the next system management task can be executed. The way in which errors are handled has to be explicitly defined within the detailed flow definition.

Moreover, system management tasks invoked by a system management flow often contain a number of internal sub-steps (e.g. task 2; 16-18). For complete error handling it is necessary to explicitly react to each potential error that can occur in sub-steps in the system management flow definition resulting in very complex constructs (4) for the invocation of one logical system management task (3). An error-aware definition for the invocation of a multi-step system management task would, for example, include the following item:
- (5) invoke the system management task
- (6) check the result of the task; in case of an error try to find out which sub-step failed
- (7-9) depending on which sub-step failed performs a certain sequence of corrective actions and try to re-run the task in order to achieve the task's goal The error handling concept just explained has the goal to resolve errors in single tasks or even sub-steps of tasks in a system management flow in order to allow for a continuation of the overall flow. In other words, this concept allows for being able to process a system management flow from the beginning to the end. In some cases, however, it might not be possible to resolve an error in one task or sub-step of a task. With the above error handling scheme the overall flow could not continue in such a case, since errors must be resolved before proceeding to the next task. This approach often leaves the managed IT infrastructure in an inconsistent state.

Instead of getting stuck at one point within a flow, it is often desirable to either
- (1) roll back all the work done so far in order to reach the consistent system state that existed before the flow, or to
- (2) go on processing the system management flow in a forced manner in order to get as much of the remaining tasks done as possible.

Option (1) gives the flow a kind of transactional semantics: "do all or nothing". Option (2) allows for processing as much of the work as possible, leaving only a few open tasks that may have to be performed manually by an operator.

With current workflow techniques such as BPEL, it is possible to implement both of the mentioned options (1) or (2). BPEL allows for starting alternative flows whenever something goes wrong in the original workflow. However, it is required to explicitly model those alternative flows for doing compensation or forced processing. In particular, it might be necessary to provide definitions for compensation or forced flows (21) for each potential position in the original flow where an error can occur.

PRIOR ART

As just explained, for performing error handling in system management flows it is necessary to explicitly include error handling instructions into flow definitions. That is, it is not sufficient to just define the logical sequence of system management task invocations, but instructions have to be included for handling each error that can potentially occur during the execution of tasks in the system management flow.

In addition to defining complex error-aware flow definitions (4) to correct errors in single tasks, there is a necessity to provide complete alternate flow definitions (21) for non-recoverable errors.

Consequently, system management flow definitions can become very complex and the designer of the flow cannot just define the simple logical structure of the flow.

Detailed knowledge about the internal structure of invoked system management tasks and about possible corrective actions is necessary to define correct error handling instructions within system management flow definitions.

The reasons for the mentioned deficiencies are twofold. On the one hand, Workflow Engines executing detailed flow definitions are primarily just interpreting and executing flows defined in a flow definition language (e.g. BPEL) and do not include any automatic mechanisms for handling errors. Every step to be done has to be explicitly defined within the flow definitions. On the other hand, there is no sophisticated communication between the Workflow Engine and invoked tasks other than the invoke call and the response call returned by the invoked task. That is, there is a lack of communication (the lack of a certain protocol) concerning the handling of errors.

OBJECT OF THE INVENTION

It is object of the present invention to provide a method and system for automated handling of resolvable and non-resolvable errors in execution of system management flows consisting of management tasks avoiding the disadvantages of the prior art.

SUMMARY OF THE INVENTION

The present invention provides a method and system for automated handling of resolvable and non-resolvable errors in execution of system management flows by enhancing Workflow Engines (30) by a standard Error Handling component (40) and by adding a supportive Error Handling Layer (90, 70, 100) to invoked system management tasks which serves as the counterpart to the Workflow Engine's Error Handling component (see FIG. 2). The additional functionality of the task-provided Error Handling Layer (70, 90, 100) is accessible for the Workflow Engine via extended web services interfaces (91, 71, 101). The Workflow Engine's Error Handling component (40) and the task-provided Error Handling Layer allow for the definition of a standard protocol between the Workflow Engine and invoked tasks (31) for automated error handling.

Furthermore, an interface and method of communication (32) between the enhanced Workflow Engine and an external Error Resolving Device (33) (such as an expert system) is defined with the purpose of using the external Error Resolving Device for automatic error recovery. The external Error Resolving Device is capable of performing corrective actions on the managed IT infrastructure using mechanisms (34) outside the scope of this invention.

The benefit of the presented architecture is that the complexity concerning error handling is completely removed from system management flow definitions, and the designer of a system management flow can concentrate on the logical structure of the flow (e.g. the correct sequence of tasks). Furthermore, there is no need for the flow designer to explicitly define compensation flows or flows for forced processing.

As a result, the designer of a system management flow just has to define the optimistic ("good case") flow (35) and the handling of errors is automatically performed by the proposed system without the need to explicitly define error handling directives in flow definitions. The flow designer just has to define occurrences of task invocations (36) within flow definitions.

With the help of the introduced Workflow Engine's Error Handling component (40), the task provided Error Handling Layer (90, 70, 100) and the interface to the external Error Resolving Device (33), the proposed architecture allows for automated error handling in the following ways:

(1) automatic correction of errors with the effect that the system management flow can continue to process
(2) automatic compensation of work done by system management flow in case of non-recoverable errors, with the effect that the managed IT infrastructure is kept in a consistent state (3) automatic processing of the flow in a forced way in case of non-recoverable errors, with the effect that as much work is done by the flow and only a few manual steps are left to the operator Option (1) is certainly the most desired one, but in case of non-recoverable errors options (2) and (3) are still better than leaving the managed IT infrastructure in the inconsistent state that exists at the point where an error occurs. The most common use cases for option (2) is for system management flows that have a provisioning character, i.e. flows that add a number of resources to an IT infrastructure. If an error in such a flow occurs it is most often desirable to roll back the work already done, i.e. remove resources that have already been provisioned from the system again, because they are of no use without the complete flow succeeding. The most common use case for option (3) is for system management flows that have a de-provisioning character, i.e. flows that remove a number of resources from an IT infrastructure. If an error in such a flow occurs it is most often desirable to remove as many of the resources from a system, and only leave as little resources as possible to be removed manually by an operator.

BRIEF DESCRIPTION OF THE DRAWINGS

The present invention is illustrated by way of example and is not limited by the shape of the Figures of the drawings in which:

FIG. 6 shows the process flow of task-provided Error Handling Layer in the compensate mode.

In the following a detailed description of the inventive Error Handling Architecture including structure and operation of the Workflow Engine's Error Handling component (40) and of the task-provided Error Handling Layer (70, 90, 100) as well as the interaction between both components will be described.

Determination of the Error Handling Strategy

Figure 1:
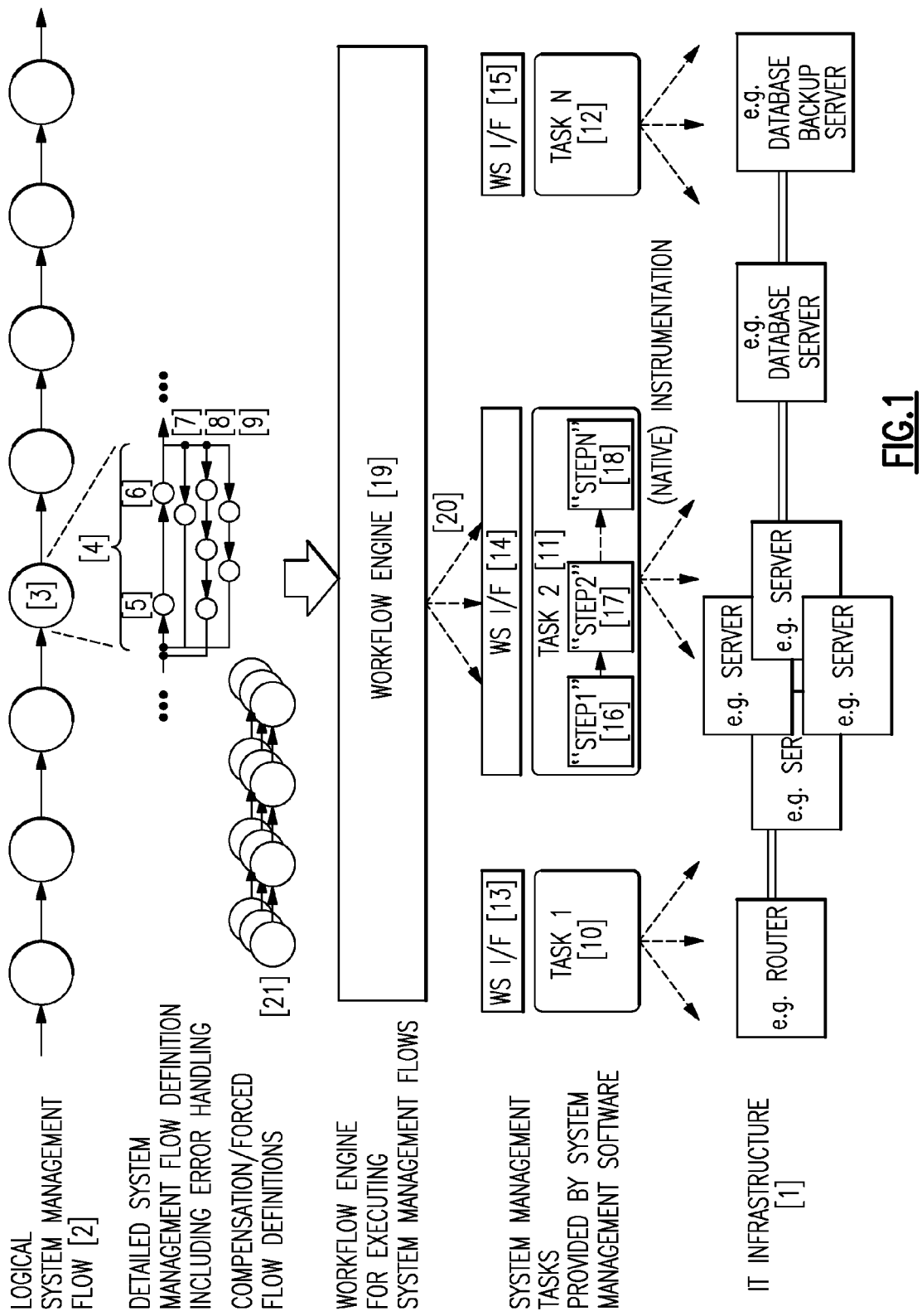
FIG. 1 shows the technical field and the prior art.
Figure 2:
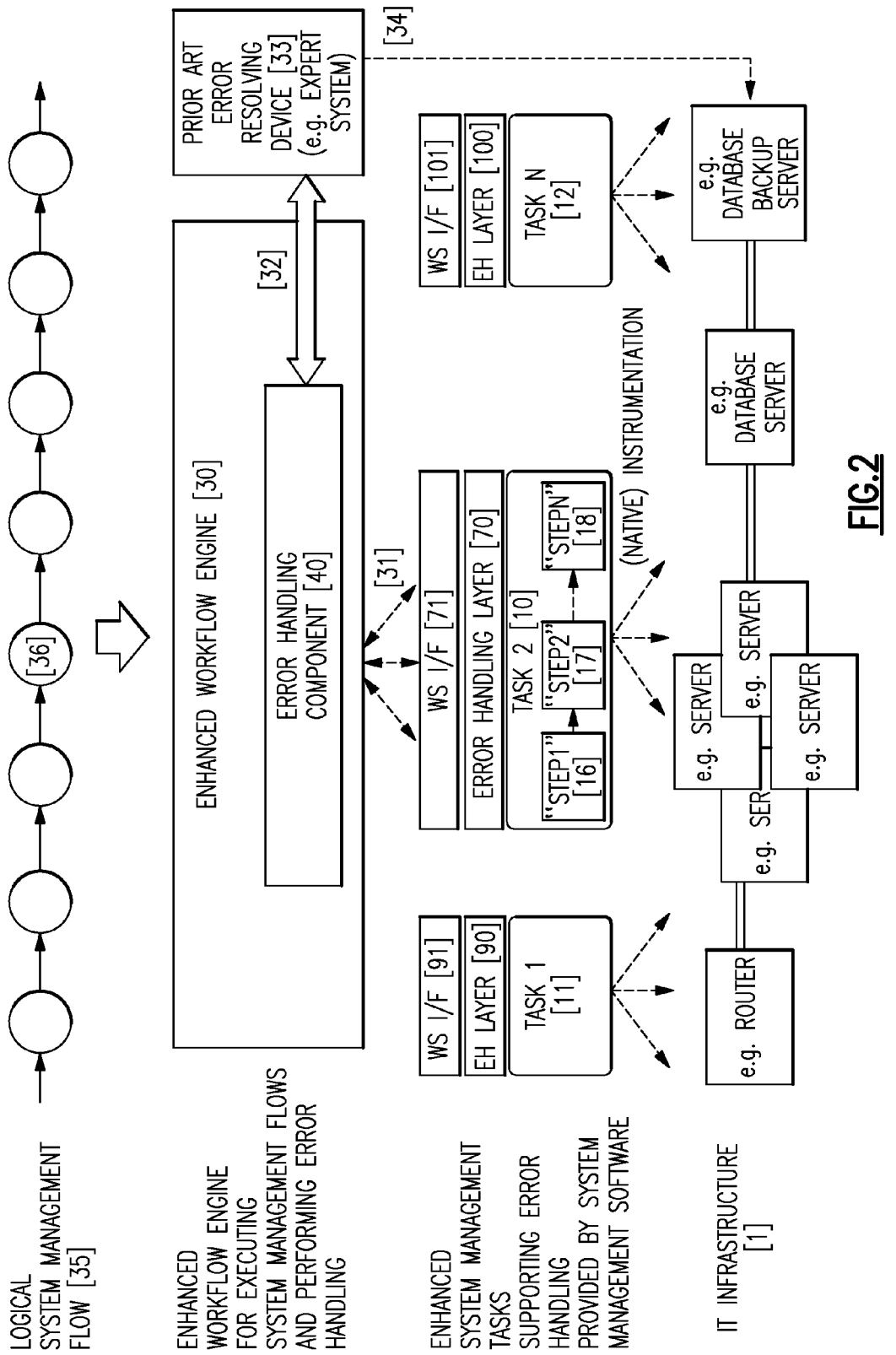
FIG. 2 shows inventive Error Handling Architecture in an IT-infrastructure.

The error handling strategy (compensation or forced processing) that shall be chosen by the proposed architecture in case of non-recoverable errors depends on the system management flow definition. That is, the designer of the system management flow definition has to define the applicable error handling strategy for each flow definition (35) in FIG. 2. Therefore, an attribute "ErrorHandlingStrategy" is introduced for each system management flow definition that determines which of the above mentioned error handling strategies shall be chosen by the proposed system. Possible values for this attribute are "compensate" or "forced".

The ErrorHandlingStrategy attribute is a top-level attribute of a flow definition, meaning that it is valid for the complete flow; it is not possible to define an error handling strategy on the level of tasks. If using for instance BPEL as the language for encoding flow definitions, the errorHandlingStrategy attribute must be defined on the top-level XML element of the BPEL flow definition.

Processing Modes of the Proposed System

In order to reflect the different error handling strategies described above and to distinguish them from the normal processing of a system management flow, the notion of a processing mode is introduced here. The proposed system can be in any one of the processing modes "normal", "compensate" or "forced" at a given point in time.

The "normal" processing mode is active as long as the system management flow can be processed normally. Normal also includes the automated resolution of errors with the effect that the flow can continue normally. In case of non-recoverable errors, one of the other processing modes is assumed.

The "compensate" mode gets activated when a non-recoverable error occurs and the error handling strategy defined for the current flow is to do compensation, i.e. the ErrorHandlingStrategy attribute of the current flow has the value "compensate". In this mode all the work done so far is automatically compensated by the system.

The "forced" mode gets activated when a non-recoverable error occurs and the error handling strategy defined for the current flow is to continue in a forced way, i.e. the ErrorHandlingStrategy attribute of the current flow has the value "forced". In this mode the remaining tasks of a flow are executed by the system in a forced, best-can-do manner.

Error Handling Component of Workflow Engine

Figure 3:
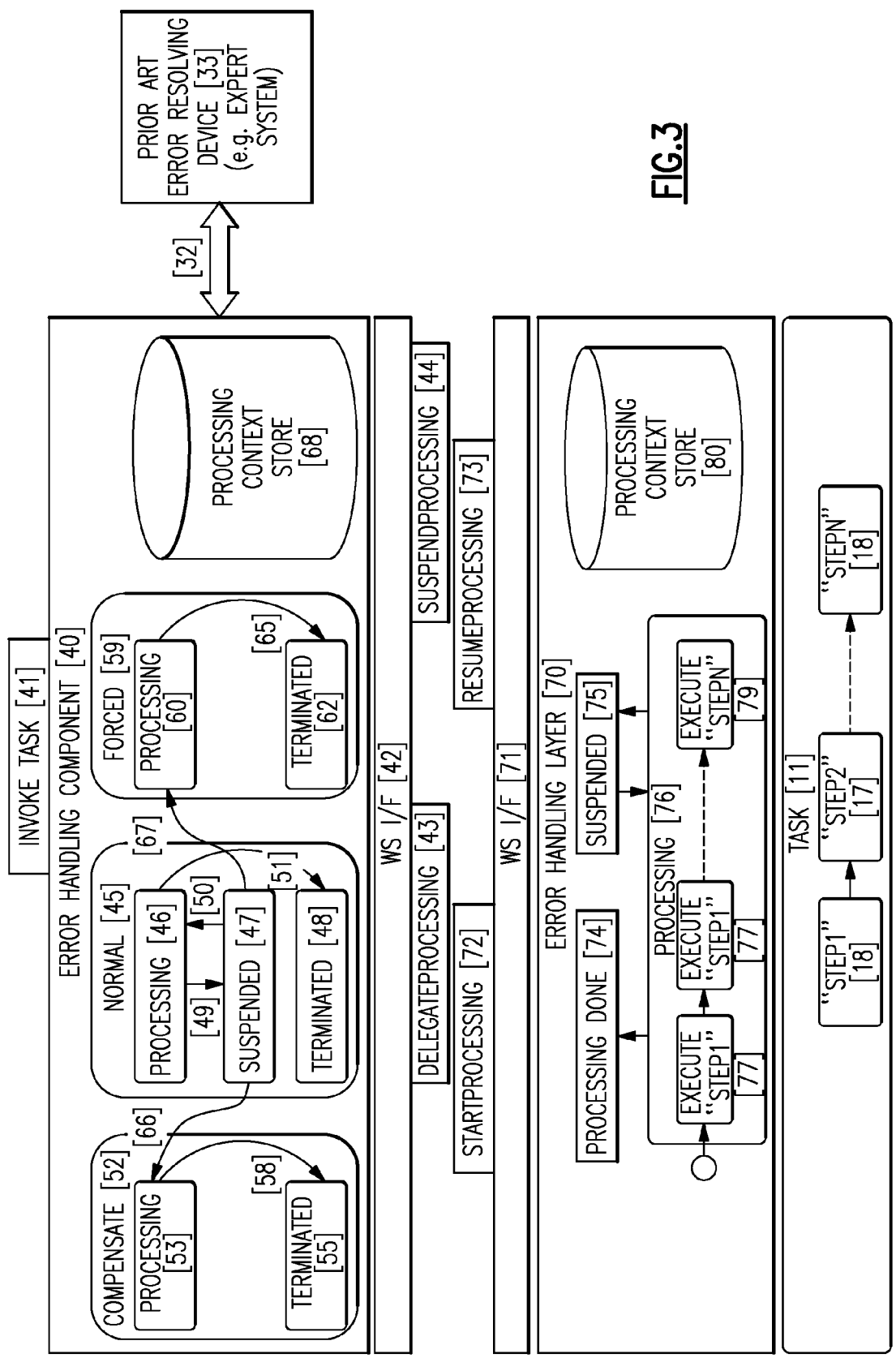
FIG. 3 shows details of the inventive Error Handling Architecture.
Figure 4:
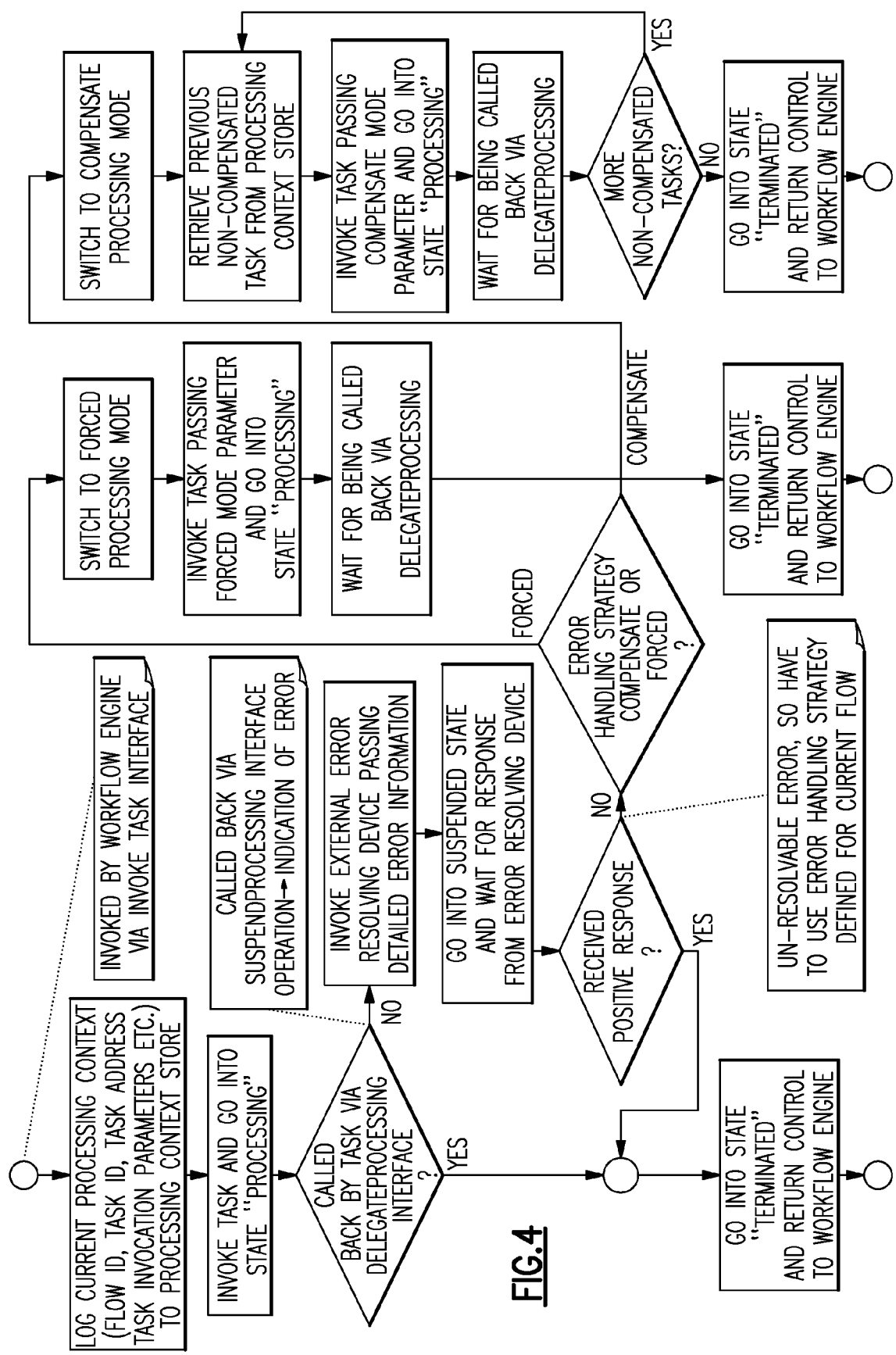
FIG. 4 shows the process flow of the Error Handling component which is part of the inventive Error Handling Architecture.

The processing flow of the Error Handling component is described in more detail with respect to FIGS. 3 and 4.

Error Handling component (40) is a component within the enhanced Workflow Engine (30) that adds implicit error handling support to the Workflow Engine. This component actually adds a layer of indirection between a normal (prior art) Workflow Engine and the tasks invoked by the Workflow Engine. Each time the Workflow Engine invokes a task defined in the flow definition (35) in FIG. 2 this call is intercepted by Error Handling component (40); the Workflow Engine's call to invoke the task is redirected to the Error Handling component's invokeTask interface (41; see FIG. 3) and the Error Handling component then actually invokes the respective task via a web service call to the task's startProcessing interface operation (72). As soon as the invoked task has finished processing, the task calls back the Workflow Engine's Error Handling component via interface operation delegateProcessing (43). Control is then given back to the normal Workflow Engine by the error handling component. The Workflow Engine can now go on processing the flow defined in flow definition (35) in FIG. 2.

While processing tasks of the system management flow (35) Error Handling component (40) builds up a set of records for the current flow in its Processing Context Store database (68). When being invoked by the Workflow Engine via the invokeTask interface (41) a record gets created that processing of task N of the system management flow has started. Whenever a task completes (Error Handling component (40) is invoked via interface operation delegateProcessing (43) in the normal or forced processing mode) the task is marked as completed. Whenever a task is compensated (error handling component (40) is invoked via interface operation delegateProcessing (43) in the compensate processing mode) the task is marked as compensated (see below).

One task record in the Processing Context Store database (68) includes the unique ID of the flow a task belongs to and a unique ID for the task itself. The unique flow ID is used to correlate records for all tasks that belong to the same flow. This makes it possible for the Error Handling component (40) to cope with multiple parallel flows that get executed by the Workflow Engine. Furthermore, one record in the Processing Context Store database (68) contains information about the actual task (11) being invoked by the Error Handling component (40), including e.g. the web service address of the task's web service interface (71) or the task's process ID. This information is used e.g. for resuming processing of a task (see below).

The described set of records that gets built up in the course of processing a flow is used by the Error Handling component to perform automatic compensation of a flow by reading the records in the reverse order they have been created. This is explained in more detail below.

During processing one task, i.e. between the time the Error Handling component (40) is invoked via invokeTask (41) and the time control is given back to the Workflow Engine, processing within Error Handling component (40) follows a state model.

Normal Processing Mode

The normal state is state "processing" (46) in the normal processing mode (45) meaning that the current task has been invoked and is currently processing normally. If an error occurs within the invoked task, the task signals the error condition (including a detailed error description) to error handling component (40) via interface operation suspendProcessing (44).

When receiving an error indication via interface operation suspendProcessing (44) the external Error Resolving device (33) is invoked via interface/protocol (32) passing the detailed error information received from the current task to that device. Then Error Handling component (40) goes into the "suspended" state (47). Communication between the Error Handling component (40) and the external Error Resolving Device (33) can be mapped to the respective flow and task via the flow and task ID stored in the processing context store.

Error Resolving Device (33) analyzes the error information received from Error Handling component (40) and tries to resolve the error condition. The way in which the error is solved is outside the scope of this invention. For example, a so-called expert system could be used as error resolving device.

As soon as the error has been resolved this is indicated to Error Handling component (40). As part of the indication message, the IDs of the flow and task that previously failed are passed to the error handling component. From the Processing Context Store (68) the Error Handling component (40) can then retrieve information about the current task (e.g. web service address of the task's web service interface). The task is then invoked via its resumeProcessing interface operation (73) and the Error Handling component (40) goes into the processing state (46) again.

If the error could not be resolved by the external Error Handling Device (33), Error Handling component (40) switches the "processing" mode according to the error handling strategy defined for the current flow and goes into the processing state of the respective mode. That is, if the errorHandlingStrategy attribute of the current flow is "compensate", error handling component (40) goes into the processing state (53) in the compensate mode (52); if the errorHandlingStrategy attribute of the current flow is "forced", Error Handling component (40) goes into the processing state (60) in the forced mode (59).

Compensate Processing Mode

After Error Handling component (40) has switched from the normal processing mode into the compensate mode (see above), a switch to another processing mode (back to normal or to forced mode) is not possible any more. Consequently, Error Handling component (40) stays in the compensate mode until all work done so far has been compensated.

The initial state in the compensate mode (52) is state processing (53). In this state the last task that has been active before switching to the compensate mode is invoked by the Error Handling component. The information that compensation shall be done is passed as a parameter to the task. The task that has to be invoked is obtained by looking up the last entry that has been added to the Processing Context Store database (68).

If the found entry is already marked as completed, the task is invoked via its startProcessing interface operation (72), where the additional information to do compensation is passed as parameter. If the found entry is not yet marked as completed, the task is invoked via its resumeProcessing interface operation (73), where the additional information to do compensation is also passed as parameter.

As soon as the invoked task has completed compensation of the work it had previously done in the normal processing mode, it calls back Error Handling component (40) via its delegateProcessing interface operation (43). The Error Handling component then looks up the next task to compensate (which is identified by the entry in the processing context store that has been created before the entry of the task that just has been compensated) and invokes the next task for doing compensation.

When all tasks that had been invoked in the normal processing mode have been compensated, i.e. have been processing in the reverse order in compensate mode, Error Handling component (40) goes into the terminated state (55), meaning that everything has been compensated and the managed IT infrastructure is now in the same consistent state it had been prior to starting the system management flow.

Forced Processing Mode

After Error Handling component (40) has switched from the normal processing mode into the forced mode (see above), a switch to another processing mode (back to normal or to compensate mode) is not possible any more. Consequently, Error Handling component (40) stays in the forced mode until all tasks have been processed.

The initial state in the forced mode (59) is state "processing" (59). In this state the last task that has been active before switching to the forced mode is invoked by the error handling component. The information that forced processing shall be done is passed as a parameter to the task. If the current task is not yet marked as completed (task has failed in normal mode and could not complete), the task is invoked via its resumeProcessing interface operation (73), where the additional information to do forced processing is passed as parameter.

As soon as the invoked task has completed its work, it calls back Error Handling component (40) via its delegateProcessing interface operation (43).

The Error Handling component (40) then writes into the Processing Context Store (68) that it is in the forced mode for the current flow and then goes into the terminated state (62) and gives back control to the Workflow Engine. When the Error Handling component is invoked by the Workflow Engine via its invokeTask interface for the next task of the same flow, it knows from the entry in the processing context store, that the current flow is in the forced mode. Consequently, it starts processing the next task in the forced processing state (60).

Error Handling Layer of Tasks

Figure 5:
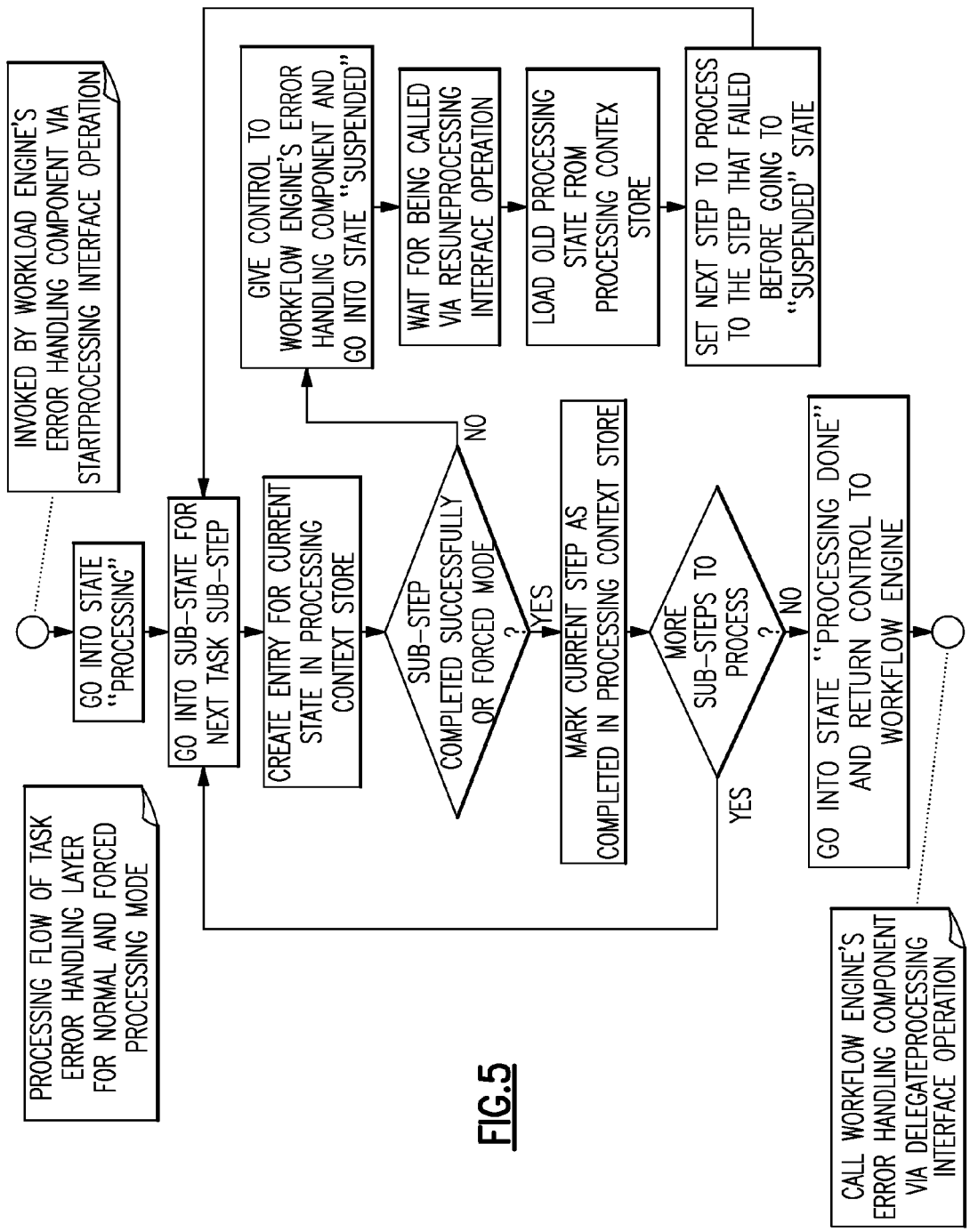
FIG. 5 shows the process flow of the task-provided Error Handling Layer in the normal/forced mode which is part of the inventive Error Handling Architecture.

Processing flow of the Error Handling Layer (70) is described in more detail with respect to FIGS. 3, 5 and 6. The Error Handling Layer (70) of tasks is an additional layer on top of tasks which is introduced by this invention. It receives invocations from the Workflow Engine, and via its internal operation and state model adds error handling support to an invoked task. The Error Handling Layer (70) embodies one endpoint of the error handling protocol between the Error Handling component (40) of a Workflow Engine and invoked tasks.

Processing within Error Handling Layer (70) follows a state model and—like the Error Handling component (40) of the Workflow Engine—uses a Processing Context Store (80) to store processing state information which is necessary in case of errors and for doing compensation.

Normal Processing (see FIG. 5)

When invoked by the Workflow Engine via its startProcessing interface operation (72) the Error Handling Layer goes into its normal state "processing" (76) and the actual task (11) starts working. For each sub-step (16-18) of the actual task, a corresponding sub-state (77-79) of the Error Handling layer's processing state exists. Whenever the task starts processing of a certain sub-step the corresponding processing sub-state is entered in the Error Handling Layer. Therefore, the developer of the enhanced (error handling capable) task has to define the correct state model for the Error Handling Layer according to the actual task, and has to implement notifications from the actual task to update the Error Handling Layer's state machine whenever a new sub-step is entered.

Furthermore, for each processing sub-state (77-79) the Error Handling Layer enters an entry in the Processing Context Store (80) is created. When the respective sub-state is left (the step is finished), the entry in the processing context store is marked as completed. The described entries for each processing sub-state in the processing context store are needed for being able to do a later compensation of the work done in normal processing mode (see below).

When an error occurs in a sub-step of the actual task the current processing sub-state of the Error Handling Layer is logged in the Processing Context Store (80). This information is later used for resuming processing of the task at the position where the failure occurred. After writing the entry to the processing context store the Error Handling Layer goes into state "suspended" (75) and hands over control to the Workflow Engine's Error Handling component by invoking its suspendProcessing interface operation (44).

The Workflow Engine's Error Handling component (40) will then try to resolve the error by means of external Error Resolving Device (33) and then resume processing of the current task by invoking the tasks resumeProcessing interface operation (73). When invoked via the resumeProcessing interface operation, the task's Error Handling Layer (70) uses the Processing Context Store (80) to look up the state that existed before going into the suspended state and then resumes processing of the actual task at the sub-step corresponding to the looked up state. For example, if an error had occurred in sub-step (17) processing sub-state (78) would have been written to the Processing Context Store (80). Then on resume, processing sub-state (78) would be loaded from the Processing Context Store (80) and the actual task would be resumed at the corresponding sub-step (17).

When all sub-steps of the task have been processed the task's Error Handling Layer (70) goes into state "processing done" (64) and gives back control to the Workflow Engine's Error Handling component (40) by invoking its delegateProcessing interface (43).

If the Workflow Engine's Error Handling component (40) could not resolve an error by means of external Error Resolving Device (33), it will switch to either compensate or forced processing mode depending on the error handling strategy defined for the current system management flow. This processing mode is passed as a parameter to the invoked task's Error Handling Layer (70).

Compensation (see FIG. 6)

When the forced processing mode has been indicated by the Workflow Engine's Error Handling component, Error Handling Layer (70) will perform a compensation of all the work it has already done in the normal processing mode.

For this purpose, entries for the processing sub-states that have already been performed are retrieved from the Processing Context Store database (80) in the reverse order, and the respective steps will be compensated in the reverse order as they have been processed in the normal processing mode. For example, if in the normal processing mode the sequence of steps has been "step1", "step2", "step3", the compensation sequence will be compensate "step3", compensate "step2", compensate "step1".

While in the compensate mode, the Error Handling Layer will not go into the suspended state again, but continue processing until all steps have been compensated. If all steps are compensated, Error Handling Layer (70) goes into the processing done state (74) and hands control to the Workflow Engine's Error Handling component by calling its delegateProcessing interface operation (3).

Forced Processing (see FIG. 5)

When the forced processing mode has been indicated by the Workflow Engine's Error Handling component, Error Handling Layer (70) will basically behave the same way as in the normal processing mode, with the exception that subsequent errors will be ignored and the task will not go into the suspended state any more. That is, all sub-steps of the task will be tried to be processed even if errors occur.

The invention claimed is:

1. A method for automated handling of resolvable and non-resolvable errors in system management flows consisting of system management tasks, wherein said system management tasks (10-12) are provided by system management applications to perform certain operations on the managed IT infrastructure (1), wherein said system management tasks (10-12) provide interfaces (13-15) via said system management tasks which are invoked (20) during the execution of the system management flow definition by a Workflow Engine (30),
characterized by the steps of:
executing a system management flow definition (35) by said Workflow Engine (30), wherein said system management flow definition additionally includes an ErrorHandlingStrategy attribute for determining the processing mode of the system management flow in the case of errors, wherein said processing mode can be "compensate", or "forced",
intercepting execution of a task as defined in said system management flow definition by said Workflow Engine (30),
invoking Error Handling component (40) via "invokeTask interface" (41), wherein said Error Handling component (40) uses an error handling interface with an Error Handling Layer (90, 70, 100) for invocation of system management tasks and for error handling, wherein said Error Handling Layer (90, 70, 100) uses a Processing Context Store (80) storing processing state information of invoked tasks,
wherein said Error Handling component (40) performs the steps of:
invoking a system management task as defined by said task via the system management task's startProcessing operation (72) of said error handling interface by said Error Handling Component (40) and storing processing state information of said invoked task in a Processing Context Store (68), wherein said Processing Context Store (68) contains information of each task being invoked including a unique task ID, a system management flow definition ID to which said task belongs to, processing state information of said invoked task, wherein said processing state can be started, completed, or compensated, and contains information for resuming processing of said invocated task,
receiving error condition via the "suspendProcessing" operation (44) of said error handling interface from said Error Handling Layer (90, 70, 100),
switching to the processing mode as defined in the "ErrorHandlingStrategy", and
processing said system management flow in a processing mode as defined in said "ErrorHandlingStrategy" accordingly.

2. The method according to claim 1, wherein said switching to said processing mode as defined in said "ErrorHandlingStrategy" is accomplished automatically without prior evaluation of said error.

3. The method according to claim 1, wherein said error condition includes a detailed error description.

4. The method according to claim 2, wherein said evaluation is accomplished by an internal or external Error Resolving Device (32) by using said error description.

5. The method according to claim 3, wherein said Error Resolving Device (32) is an Expert system.

6. The method according to claim 1, further including the steps of:
receiving a non-error condition via the "delegateProcessing" operation (43) of said error handling interface from said Error Handling Layer if the processing is done,
giving back control to said Workflow Engine for continuing execution of the subsequent system management task as defined in said system management flow definition (35).

7. The method according to claim 1, wherein said ErrorHandlingStrategy is valid for the entire system management flow.

8. The method according to claim 1, wherein said Error Handling Strategy attribute is defined on the top-level XML element of the BPEL system management flow definition if BPEL is used as the language for encoding system management flow definitions.

9. The method according to claim 1, further including the steps of:
invoking a system management task consisting of sub tasks via said start processing operation of said error handling interface,
creating for each sub task a processing state in said processing context database (80) by said Error Handling Layer (90, 70, 100),
logging said current processing state if an error occurs,
setting the processing state "processing state suspended" of said Error Handling Layer, and
invoking said Error Handling component via said suspendProcessing operation (44) of said error handling interface with an error condition.

10. The method according to claim 6, wherein in the case of switching from the normal processing mode to the processing mode "compensate" the following further steps are performed:

loading said previously stored process state information from said Processing Context Store (68), invoking the last active task according to said process state information via said error handling interface (71), compensating the work previously done by said task by using processing state information previously stored in said Process Context Store (80), repeating those steps for all previously invoked tasks in the reverse order according to process state information loaded from said Process Context Store (68).

11. The method according to claim 6, wherein in the case of switching from the normal processing mode to the processing mode "forced" the following further steps are performed:

invoking the previously failed task according to the Process Context Store (68), ignoring all subsequent errors in said previously failed task, continuing said system management flow in said forced processing mode, ignoring all errors in said subsequent tasks of said system management flow.

12. The method according to claim 11, wherein said error descriptions of all ignored errors are logged in said Processing Context Store (68).

13. A system for automated error handling of resolvable and non-resolvable errors in system management flows consisting of system management tasks, wherein said system management tasks (10-12) are provided by system management applications to perform certain operations on the managed IT infrastructure (1), wherein said system management tasks (10-12) provide interfaces (13-15) via said system management tasks to be get invoked (20) during the execution of the system management flow definition, characterized by the means of:

a Workflow Engine (30) for executing a system management flow definition, wherein said system management flow definition additionally includes an ErrorHandlingStrategy attribute for determining the processing mode of the system management flow, wherein said processing mode can be "compensate", or "forced", wherein said Workflow Engine including:

means for intercepting execution of a task as defined in said system management flow definition, means for invoking Error Handling component (40) via "invokeTask interface" (41), an Error Handling Component which uses a Processing Context Store (68) to store processing state information, wherein said Processing Context Store (68) contains information of each task being invoked including a unique task ID, a system management flow definition ID to which said task belongs to, processing state information of said invoked task, wherein said processing state can be started, completed, or compensated, and contains information for resuming processing of said invocated task, and further, wherein said Error Handling component uses an error handling protocol with an Error Handling Layer (90, 70, 100) for invoked system management tasks, wherein said Error Handling Layer uses a Processing Context Store (80) to store processing state information, wherein said Error Handling component including:

means for invoking a system management task as defined by said system management flow definition via the system management task's startProcessing interface operation (72), means for receiving error condition via interface "suspendProcessing" (44) of said error handling interface from said Error Handling Layer, and means for switching to the processing mode as defined in the "ErrorHandlingStrategy".

14. The system according to claim 13, wherein said means for switching to said processing mode as defined in the "ErrorHandlingStrategy" includes means for prior evaluation that said error is non-resolvable.

15. The system according to claims 13, wherein said means for switching to said processing mode as defined in said "ErrorHandlingStrategy" is automatically used without prior evaluation of said error.

16. The system according to claim 13, wherein said error condition includes a detailed error description.

17. The system according to claim 14, wherein said means for evaluation is an internal or external Error Resolving Device (32).

18. The system according to claim 13, further including means for receiving a non-error condition via the "delegateProcessing" operation (43) of said error handling interface from said Error Handling Layer if the processing is done and for giving back control to said Workflow Engine for continuing execution of the subsequent task as defined in said system management flow definition (35).

* * * * *